United States Patent
Chan et al.

(10) Patent No.: US 12,191,767 B2
(45) Date of Patent: Jan. 7, 2025

(54) APPARATUS AND METHOD FOR APPLYING DYNAMIC COMPENSATION TO FEEDBACK SIGNAL GENERATED FROM LOADLINE OF VOLTAGE REGULATOR

(71) Applicant: MediaTek Singapore Pte. Ltd., Singapore (SG)

(72) Inventors: Man Pun Chan, San Jose, CA (US); Hao-Ping Hong, San Jose, CA (US); Yung-Chih Yen, San Jose, CA (US); Chien-Hui Wang, Hsinchu (TW); Cheng-Hsuan Fan, Hsinchu (TW); Jian-Rong Huang, Hsinchu (TW)

(73) Assignee: MediaTek Singapore Pte. Ltd., Singapore (SG)

( * ) Notice: Subject to any disclaimer, the term of this patent is extended or adjusted under 35 U.S.C. 154(b) by 47 days.

(21) Appl. No.: 17/719,401

(22) Filed: Apr. 13, 2022

(65) Prior Publication Data
US 2022/0393587 A1 Dec. 8, 2022

Related U.S. Application Data

(60) Provisional application No. 63/195,733, filed on Jun. 2, 2021.

(51) Int. Cl.
*H02M 3/156* (2006.01)
*H02M 1/00* (2006.01)

(52) U.S. Cl.
CPC ......... *H02M 3/156* (2013.01); *H02M 1/0009* (2021.05)

(58) Field of Classification Search
CPC ..... G05F 1/00; G05F 1/10; G05F 1/12; G05F 1/46; G05F 1/455; G05F 1/45;
(Continued)

(56) References Cited

U.S. PATENT DOCUMENTS

| | | | |
|---|---|---|---|
| 7,436,158 B2 * | 10/2008 | Huang | H02M 3/158 323/283 |
| 8,134,354 B2 * | 3/2012 | Tang | H02M 3/1584 323/283 |

(Continued)

FOREIGN PATENT DOCUMENTS

| CN | 1848018 A | 10/2006 |
|---|---|---|
| CN | 103219885 A | 7/2013 |

(Continued)

OTHER PUBLICATIONS

Huang Zhaoxia et al., "Research on Current Control Mode Single-Phase Dynamic Voltage Regulator Based on Pole-Assignment and Repetitive Control", Transactions of China Electrotechnical Society, vol. 27, No. 6, Jun. 2012, pp. 252-260, State Key Laboratory of Advanced Electromagnetic Engineering and Technology Huazhong University of Science and Technology, Wuhan 430074 China.

*Primary Examiner* — Jeffrey A Gblende
(74) *Attorney, Agent, or Firm* — Winston Hsu

(57) ABSTRACT

A feedback loop circuit of a voltage regulator includes a loadline and a compensation circuit. The loadline generates a feedback signal according to a sensed current signal that provides information of an inductor current of the voltage regulator, and outputs the feedback signal to a controller circuit of the voltage regulator for regulating an output voltage of the voltage regulator. The compensation circuit generates a compensation signal to compensate for a deviation of the output voltage, wherein the feedback signal generated from the loadline is affected by the compensation signal.

18 Claims, 7 Drawing Sheets

(58) Field of Classification Search
CPC ... G05F 1/445; G05F 1/66; G05F 1/40; G05F
1/42; G05F 1/44; G05F 1/462; G05F
1/52; G05F 1/56; G05F 3/10; G05F 3/16;
G05F 3/18; G05F 3/185; G05F 3/20;
G05F 3/26; G05F 3/30; G05F 3/205;
G05F 3/22; G05F 3/24; G05F 3/222;
G05F 3/242; G05F 3/225; G05F 3/227;
G05F 3/245; G05F 3/247; G05F 3/262;
G05F 3/265; G05F 3/267; G05F 1/575;
H02M 5/2573; H02M 1/081; H02M
5/293; H02M 7/12; H02M 3/10; H02M
3/125; H02M 3/13; H02M 3/135; H02M
3/145; H02M 3/15; H02M 3/155; H02M
3/156; H02M 3/157; H02M 3/158; H02M
1/346; H02M 3/1588; H02M 2003/1566;
H02M 3/1582; H02M 3/1584; H02M
2003/1557; H02M 1/0032; H02M 1/4225;
H02M 7/217; H02M 1/0025; H02M
1/0045; H02M 1/0009; H02M 3/22;
H02M 1/08; H02M 1/36; H02M 3/24;
H02M 3/325; H02M 3/335; H02M 3/28;
H02M 3/01; H02M 3/33569; H02M
3/33507; H02M 2007/4815; H02M
2007/4818; H02M 1/083; H02M 3/33538;
H02M 3/33546; H02M 3/33515; H02M
3/33576; H02M 3/33592; H02M 3/33553;
H02M 3/33523; H02M 3/33561; H02M
1/4233; H02M 1/12; H02M 3/07; H02M
7/219; H02M 7/4815; H02M 1/0048;
H05B 39/048; B23K 11/24; H04B
2215/069; Y02B 70/1491
See application file for complete search history.

(56) References Cited

U.S. PATENT DOCUMENTS

| | | | |
|---|---|---|---|
| 8,629,666 | B2 | 1/2014 | Carroll |
| 8,729,955 | B2 * | 5/2014 | Nien ............... H03K 3/011 |
| | | | 323/369 |
| 9,541,974 | B1 | 1/2017 | Presti |
| 9,641,081 | B2 * | 5/2017 | Krabbenborg ...... H03F 3/45179 |
| 10,425,006 | B2 | 9/2019 | Babazadeh |
| 10,855,171 | B2 * | 12/2020 | Lu ................... H02M 1/4225 |
| 2009/0121695 | A1 | 5/2009 | Pierson |
| 2010/0164443 | A1 | 7/2010 | Tumminaro |
| 2010/0283438 | A1 | 11/2010 | Chung |
| 2013/0188399 | A1 | 7/2013 | Tang |
| 2014/0002047 | A1 | 1/2014 | Houston |
| 2016/0187386 | A1 | 6/2016 | El-Damak |
| 2022/0329147 | A1 * | 10/2022 | Wen ................. H02M 1/0009 |

FOREIGN PATENT DOCUMENTS

| | | |
|---|---|---|
| CN | 111880598 A | 11/2020 |
| TW | I559112 B | 11/2016 |
| TW | M545931 U | 7/2017 |
| TW | 202102059 A | 1/2021 |

* cited by examiner

APPARATUS AND METHOD FOR APPLYING DYNAMIC COMPENSATION TO FEEDBACK SIGNAL GENERATED FROM LOADLINE OF VOLTAGE REGULATOR

CROSS REFERENCE TO RELATED APPLICATIONS

This application claims the benefit of U.S. Provisional Application No. 63/195,733, filed on Jun. 2, 2021. The content of the application is incorporated herein by reference.

BACKGROUND

The present invention relates to a voltage regulator design, and more particularly, to a voltage regulator using a compensation circuit to apply dynamic compensation to a feedback signal generated from a loadline and an associated compensation method.

In an electronic device, a voltage regulator is used to supply stable power to electronic loads. The voltage regulator is typically designed to maintain an output voltage within specified limits. In some applications, the voltage regulator may support an adaptive voltage positioning (AVP) feature. Hence, a loadline is implemented for generating a feedback signal according to a load current supplied to a load. For example, the load may be a microprocessor. However, sensing the load current is not feasible. To obtain the load information, inductor current is often sensed and used as an approximation of the load current. In some cases, this approximation fails and affects the performance of the output voltage regulation. Thus, there is a need for an innovative compensation design for a voltage regulator with AVP.

SUMMARY

One of the objectives of the claimed invention is to provide a voltage regulator using a compensation circuit to apply dynamic compensation to a feedback signal generated from a loadline and an associated compensation method.

According to a first aspect of the present invention, an exemplary feedback loop circuit of a voltage regulator is disclosed. The exemplary feedback loop circuit includes a loadline and a compensation circuit. The loadline is arranged to generate a feedback signal according to a sensed current signal that provides information of an inductor current of the voltage regulator, and output the feedback signal to a controller circuit of the voltage regulator for regulating an output voltage of the voltage regulator. The compensation circuit is arranged to generate a compensation signal to compensate for a deviation of the output voltage, wherein the feedback signal generated from the loadline is affected by the compensation signal.

According to a second aspect of the present invention, an exemplary compensation method employed by a voltage regulator is disclosed. The exemplary compensation method includes: according to a sensed current signal that provides information of an inductor current of the voltage regulator, generating a feedback signal through a loadline; generating a compensation signal to compensate for a deviation of an output voltage of the voltage regulation, wherein the feedback signal is affected by the compensation signal; and outputting the feedback signal to a controller circuit of the voltage regulator for regulating the output voltage.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
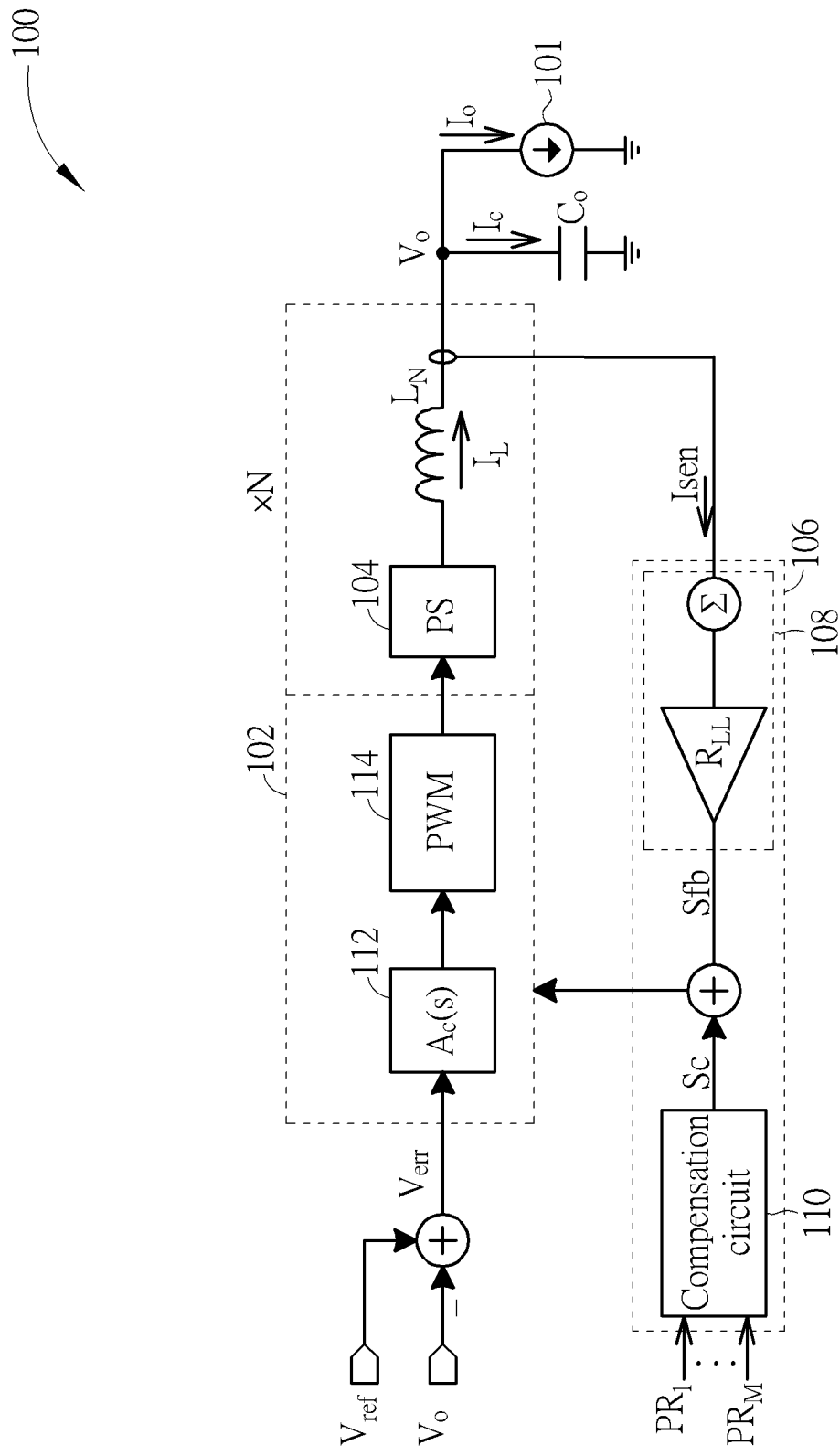
FIG. 1 is a diagram illustrating a first voltage regulator according to an embodiment of the present invention.

FIG. 1 is a diagram illustrating a first voltage regulator according to an embodiment of the present invention. The voltage regulator 100 may be a switching voltage regulator with adaptive voltage positioning (AVP). The voltage regulator 100 is capable of regulating the output voltage $V_o$ delivered to the load 101. For example, the load 101 may be a microprocessor. It should be noted that the load current $I_o$ supplied to the load 101 may vary in response to different load conditions of the load 101. Hence, when the load condition of the load 101 remains unchanged, the load current $I_o$ is unchanged. As shown in FIG. 1, the voltage regulator 100 may include a controller circuit 102, a power stage circuit (labeled as "PS") 104, an inductor $L_N$, an output capacitor $C_o$, and a feedback loop circuit 106. The feedback loop circuit 106 includes a loadline 108 and a compensation circuit 110. The controller circuit 102 may act as a pulse-width modulation (PWM) controller, and may include a filter circuit (labeled as "$A_c(s)$") 112 and a PWM signal generator circuit (labeled by "PWM") 114. The controller circuit 102 is a part of an output voltage feedback loop. In this embodiment, the controller circuit 102 operates in response to an error voltage $V_{err}$ (which is indicative of difference between the output voltage $V_o$ and a reference voltage $V_{ref}$ of the voltage regulator 100) and a feedback signal $S_{fb}$ generated from the feedback loop circuit 106. Specifically, the PWM signal generator circuit 114 is arranged to deal with PWM control of the following power stage circuit 104. Hence, the PWM signal generator circuit 114 can regulate the output voltage $V_o$ delivered to the load 101 by controlling PWM pulses applied to the power stage circuit 104. For example, the power stage circuit 104 may include a high-side switch and a low-side switch controlled by PWM pulses generated from the PWM signal generator circuit 114. The voltage regulator 100 may be a multi-phase voltage regulator including N (N≥2) sets of power stage circuit and inductor coupled between the controller circuit (e.g. multi-phase PWM controller) 102 and the load 101 in parallel. However, this is for illustrative purposes only, and is not meant to be a limitation of the present invention. Alternatively, the voltage regulator 100 may be a single-phase voltage regulator including only one set (N=1) of power stage circuit and inductor coupled between the controller circuit (e.g. single-phase PWM controller) 102 and the load 101.

As shown in FIG. 1, the average inductor current ave($I_L$) of the inductor $L_N$ is equal to a sum of the average capacitor current ave($I_c$) of the output capacitor $C_o$ and the average load current ave($I_o$) of the load 101 (i.e. ave($I_L$)=ave($I_o$)+ave($I_c$)). In a steady state, the average inductor current ave($I_L$) is equal to the average load current ave ($I_o$) due to ave($I_c$)=0. The inductor current $I_L$ can be sensed to act as an approximation of the load current $I_o$. Hence, the loadline 108 is arranged to generate the feedback signal $S_{fb}$ according to a sensed current signal $I_{sen}$ that provides information of the inductor current $I_L$ ($I_{sen} \cong I_L$), and output the feedback signal $S_{fb}$ to the controller circuit 102. In a first exemplary design, the sensed current signal $I_{sen}$ may be derived from sensing the "actual" inductor current $I_L$ through some form of sensing circuit like direct current resistance (DCR)-sensing $V_o/I_c$. In a second exemplary design, the sensed current signal $I_{sen}$ may be provided by the power stage circuit 104. In a third exemplary design, the sensed current signal $I_{sen}$ may be provided by sensing other node of the voltage regulator (e.g. $V_o/I_c$). In a fourth exemplary design, the sensed current signal $I_{sen}$ may be generated with no physical sensing (e.g. purely synthesized by a digital/analog circuit). To put it simply, the present invention has no limitations on the means of generating the sensed current signal $I_{sen}$ that is representative of the inductor current $I_L$.

Figure 2:
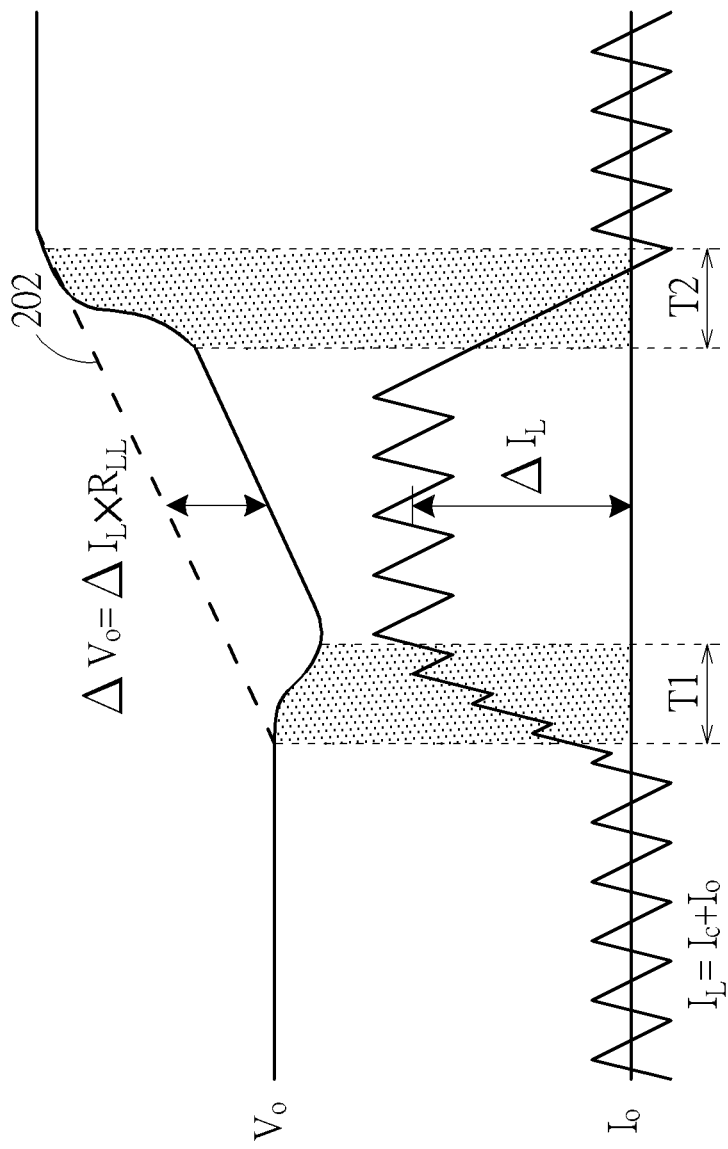
FIG. 2 is a diagram illustrating a deviation of the output voltage resulting from a dynamic voltage identification (DVID) up event that happens under a condition that the proposed compensation circuit is not enabled.

However, the above-mentioned approximation fails under some cases. If no compensation is applied to the inaccurate loadline, the performance of the PWM controller will be degraded. FIG. 2 is a diagram illustrating a deviation of the output voltage $V_o$ resulting from a dynamic voltage identification (DVID) up event that happens under a condition that the proposed compensation circuit 110 is not enabled. The DVID up event is to change the output voltage $V_o$ from a present voltage setting to a next voltage setting, where the next voltage setting is higher than the present voltage setting. The increase of the inductor current $I_L$ is used to charge the output capacitor $C_o$, such that the output voltage $V_o$ can ramp up accordingly. Specifically, the capacitor current $I_c$ of the output capacitor $C_o$ is a non-zero charging current. Though the load current $I_o$ is unchanged during the DVID up event, the extra charging current will be considered as an increase of the inductor current $I_L$ in the AVP loop. As a result, the output voltage $V_o$ has an undesired offset $\Delta V = \Delta I_L \times R_{LL}$, where $R_{LL}$ is the loadline resistance value. During the DVID up event, the load 101 (e.g. microprocessor) expects that the output voltage $V_o$ follows the ramp-up curve 202. However, due to the fact that the inductor current $I_L$ cannot be an approximation of the load current $I_o$ during the DVID up event, the output voltage $V_o$ has a voltage decrease during a period T1, and has a voltage increase during a period T2.

Figure 3:
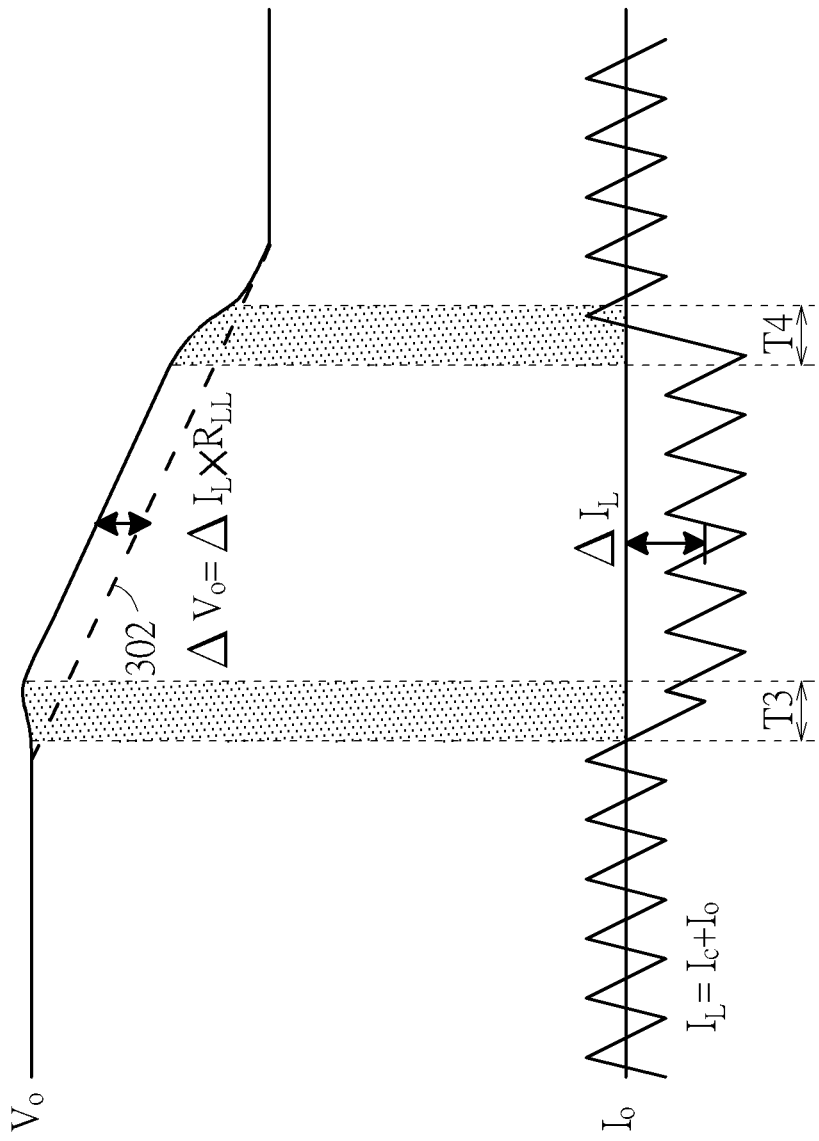
FIG. 3 is a diagram illustrating a deviation of the output voltage resulting from a DVID down event that happens under a condition that the proposed compensation circuit is not enabled.

FIG. 3 is a diagram illustrating a deviation of the output voltage $V_o$ resulting from a DVID down event that happens under a condition that the proposed compensation circuit 110 is not enabled. The DVID down event is to change the output voltage $V_o$ from a present voltage setting to a next voltage setting, where the next voltage setting is lower than the present voltage setting. The decrease of the inductor current $I_L$ is used to discharge the output capacitor $C_o$, such that the output voltage $V_o$ can ramp down accordingly. Specifically, the capacitor current $I_c$ of the output capacitor $C_o$ is a non-zero discharging current. Though the load current $I_o$ is unchanged during the DVID down event, the extra discharging current will be considered as a decrease of the inductor current $I_L$ in the AVP loop. As a result, the output voltage $V_o$ has an undesired offset $\Delta V = \Delta I_L \times R_{LL}$, where $R_{LL}$ is the loadline resistance value. During the DVID down event, the load 101 (e.g. microprocessor) expects that the output voltage $V_o$ follows the ramp-down curve 302. However, due to the fact that the inductor current $I_L$ cannot be an approximation of the load current $I_o$ during the DVID down event, the output voltage $V_o$ has a voltage increase during a period T3, and has a voltage decrease during a period T4.

Furthermore, during a phase number change event that changes a number of phases enabled in the voltage regulator 100 from a first phase number to a second phase number different from the first phase number, the inductor current $I_L$ also cannot be an approximation of the load current $I_o$. For example, when the phase number (i.e. the number of phases enabled in the multi-phase voltage regulator) decreases, the remaining phase current needs to be settled to a new level, which may result in undershoot of the output voltage $V_o$ if no compensation is applied to the inaccurate loadline. The output voltage undershoot does not only happen when the phase number decreases. It could happen when an operation mode transition happens. For example, the output voltage undershoot happens when there is transition between a continuous conduction mode (CCM) and a discontinuous conduction mode (DCM).

Regarding a voltage regulator with AVP, the output voltage is affected when the inductor current cannot be an approximation of the load current. Specifically, as long as the inductor current undergoes some kind of dynamic, it affects the output voltage, even the load current is unchanged. To address this issue, the present invention proposes using the compensation circuit 110 to generate a compensation signal $S_c$ to compensate for a deviation (e.g. offset or undershoot) of the output voltage $V_o$. The feedback signal $S_{fb}$ generated from the loadline 108 is affected by the compensation signal $S_c$. In other words, the feedback signal $S_{fb}$ is compensated before arriving at the controller circuit 102. For example, the compensation signal $S_c$ may be injected to the feedback signal $S_{fb}$ to update the feedback signal $S_{fb}$ finally obtained by the controller circuit 102, that is, $S_{fb}' = S_{fb} + S_c$. The polarity of the compensation signal $S_c$ may vary, depending upon the disturbance of the inductor current $I_L$. The compensation circuit 110 may receive a plurality of parameters $PR_1$-$PR_M$ (M≥2), and may refer to one or more of the parameters $PR_1$-$PR_M$ to determine polarity and/or magnitude of the compensation signal $S_c$. Further details of the compensation circuit 110 are described as below with reference to the accompanying drawings.

Figure 4:
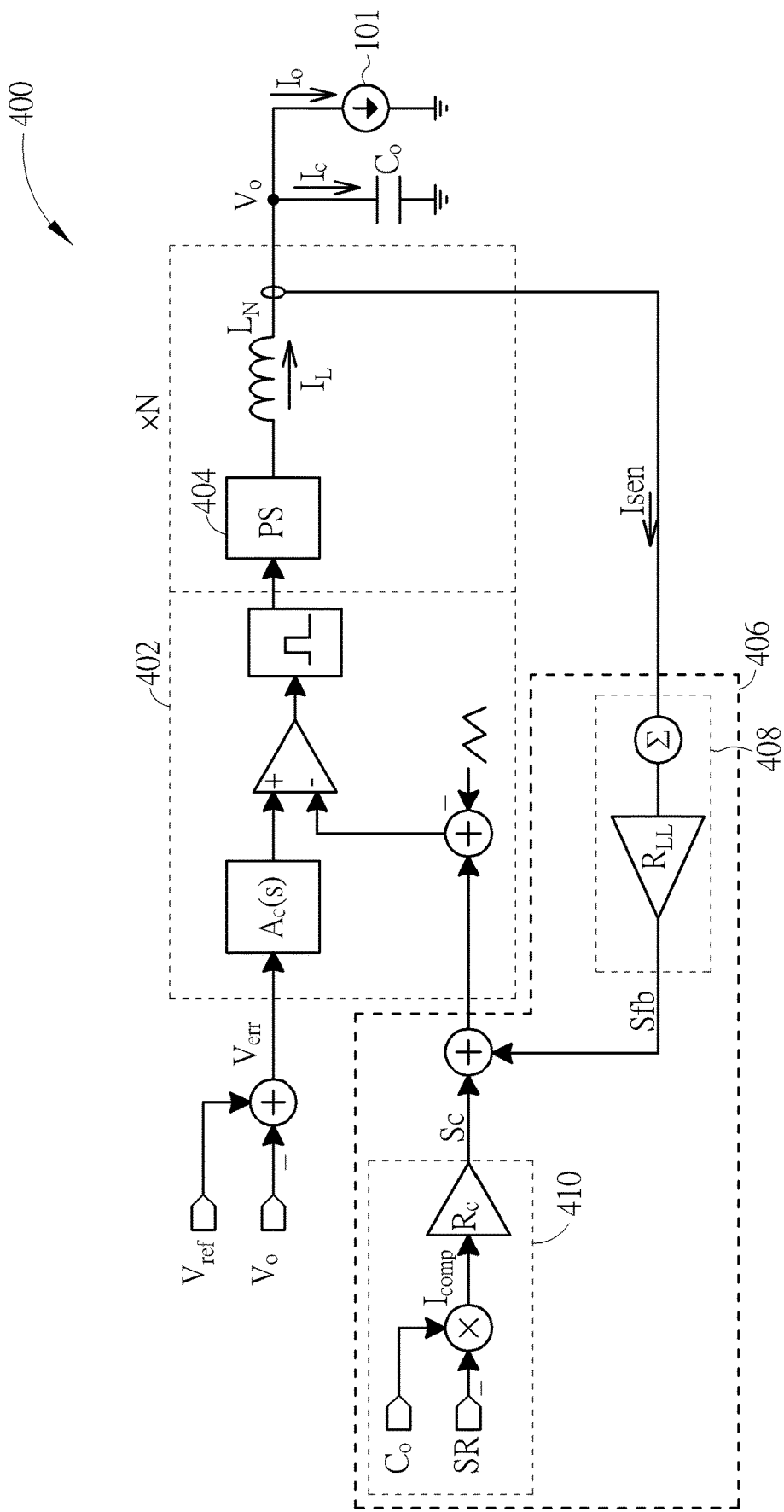
FIG. 4 is a diagram illustrating a second voltage regulator according to an embodiment of the present invention.

FIG. 4 is a diagram illustrating a second voltage regulator according to an embodiment of the present invention. The voltage regulator 400 may be a switching voltage regulator with AVP. Like the voltage regulator 100, the voltage regulator 400 is capable of regulating the output voltage $V_o$ delivered to the load (e.g. microprocessor) 101. As shown in FIG. 4, the voltage regulator 400 may include a controller circuit 402, a power stage circuit (labeled as "PS") 404, an inductor $L_N$, an output capacitor $C_o$, and a feedback loop circuit 406. In this embodiment, the voltage regulator 400 may be a multi-phase voltage regulator including N (N≥2) sets of power stage circuit and inductor coupled between the controller circuit 402 and the load 101 in parallel. However, this is for illustrative purposes only, and is not meant to be a limitation of the present invention. Alternatively, the voltage regulator 400 may be a single-phase voltage regulator including only one set (N=1) of power stage circuit and inductor coupled between the controller circuit 402 and the load 101.

The feedback loop circuit 406 includes a loadline 408 and a compensation circuit 410. The feedback signal $S_{fb}$ generated from the loadline 408 is based on the sensed current signal $I_{sen}$ that provides information of the inductor current $I_L$. It should be noted that the present invention has no limitations on the means of generating the sensed current signal $I_{sen}$ that is representative of the inductor current $I_L$. The compensation circuit 110 shown in FIG. 1 may be implemented by the compensation circuit 410, where the parameters $PR_1$-$PR_M$ include parameters $C_o$ and SR. In this embodiment, the compensation circuit 410 is arranged to generate the compensation signal $S_c$ in response to a DVID event. As shown in FIG. 4, two parameters $C_o$ and SR are received by the compensation circuit 410, where the parameter $C_o$ is the capacitance of the output capacitor, and the parameter SR may be provided by the load 101 (e.g. microprocessor) and indicates a slew rate of changing the output voltage $V_o$ from a present voltage setting (which is indicated by a present VID) to a next voltage setting (which is indicated by a next VID). As mentioned above, the increase of the inductor current $I_L$ during a DVID up event results from a non-zero charging current of the output capacitor $C_o$, and the decrease of the inductor current $I_L$ during a DVID down event results from a non-zero discharging current of the output capacitor $C_o$. A product of the parameters (i.e. $C_0 \times SR$) may be regarded as an estimation of the charging/discharging current of the output capacitor $C_o$ that happens during a DVID up/down event. The compensation signal $S_c$ is generated according to a compensation current $I_{comp}$ with a current value set by a product of the two parameters (i.e. $C_0 \times SR$), and then injected to the feedback signal $S_{fb}$ generated from the loadline 408 according to the sensed current signal $I_{sen}$ that provides information of the inductor current $I_L$ ($I_{sen} \cong I_L$). In this way, disturbance of the feedback signal $S_{fb}$ that results from mismatch between the load current $I_o$ (which may be unchanged during the DVID up/down event) and the inductor current $I_L$ (which may be increased/decreased by the charging/discharging current of the output capacitor $C_o$ during the DVID up/down event) can be compensated by the compensation signal $S_c$. For example, $|I_c \times R_{LL}| = |C_o \times SR \times R_c|$, where $R_c$ is the resistance value of the compensation circuit 410.

Figure 5:
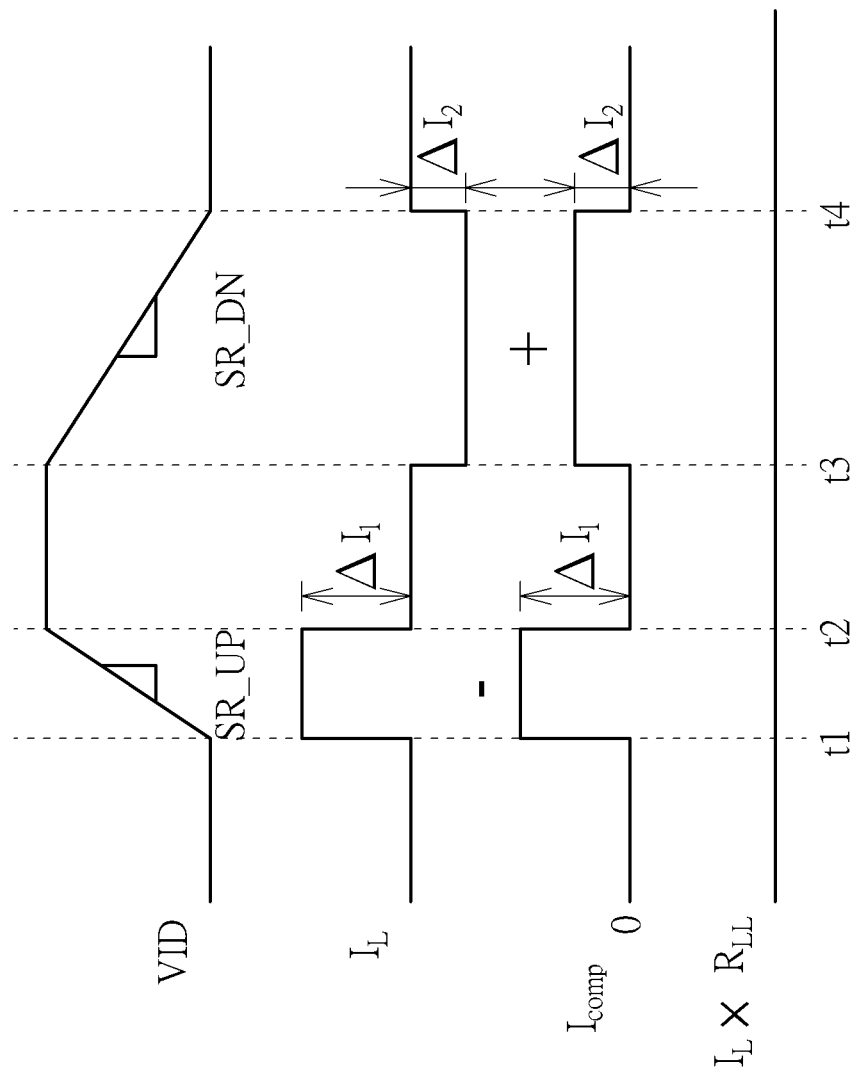
FIG. 5 is a diagram illustrating dynamic current compensation during a DVID up event and a DVID down event according to an embodiment of the present invention.

Please refer to FIG. 4 in conjunction with FIG. 5. FIG. 5 is a diagram illustrating dynamic current compensation during a DVID up event and a DVID down event according to an embodiment of the present invention. A DVID up event is triggered at t1, such that a VID voltage of the load 101 (e.g. microprocessor) changes from a present voltage setting at t1 to a higher voltage setting at t2 according to a slew rate SR_UP determined by the load 101 (e.g. microprocessor). During the DVID up event, the inductor current $I_L$ is increased by the charging current $I_c$ of the output capacitor $C_o$. In response to the DVID up event, the compensation current $I_{comp}$ is generated by the compensation circuit 410 according to the output capacitance $C_o$ and the slew rate SR (SR=SR_UP). During the DVID up event, the disturbance $\Delta I_1$ of the inductor current $I_L$ is compensated by the compensation current $I_{comp}$. In this way, the final feedback signal $S_{fb}$ ($S_{fb} = S_{fb} + S_c$) received by the controller circuit 402 remains unchanged under a condition that the load current $I_o$ is unchanged during the period from t1 to t2.

A DVID down event is triggered at t3, such that a VID voltage of the load 101 (e.g. microprocessor) changes from a present voltage setting at t3 to a lower voltage setting at t4 according to a slew rate SR_DN determined by the load 101 (e.g. microprocessor). During the DVID down event, the inductor current $I_L$ is decreased by the discharging current $I_c$ of the output capacitor $C_o$. In response to the DVID down event, the compensation current $I_{comp}$ is generated by the compensation circuit 410 according to the output capacitance $C_o$ and the slew rate SR=SR_DN. During the DVID down event, the disturbance $\Delta I_2$ of the inductor current $I_L$ is compensated by the compensation current $I_{comp}$. In this way, the final feedback signal $S_{fb}$ ($S_{fb} = S_{fb} + S_c$) received by the controller circuit 402 remains unchanged under a condition that the load current $I_o$ is unchanged during the period from t3 to t4.

Figure 6:
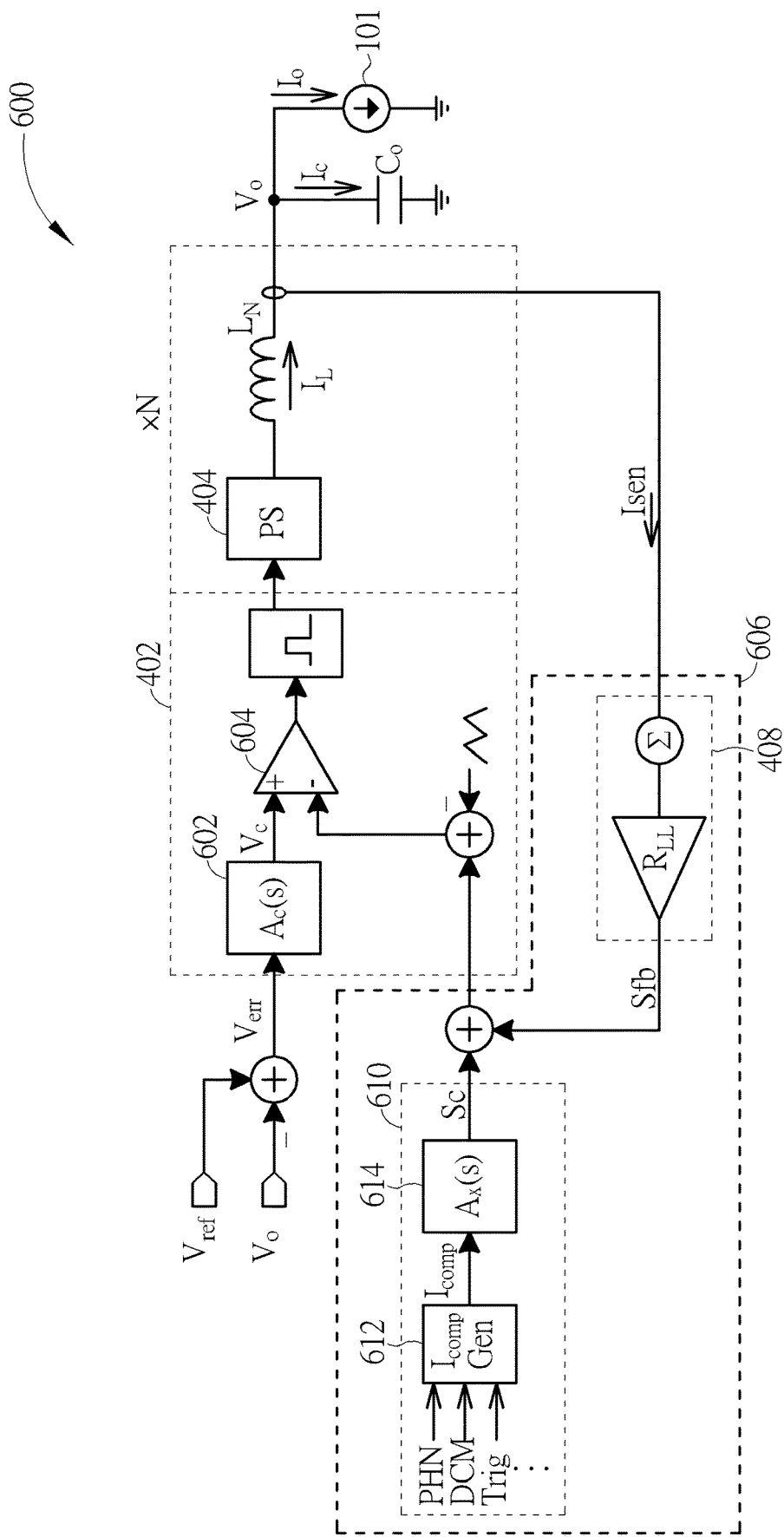
FIG. 6 is a diagram illustrating a third voltage regulator according to an embodiment of the present invention.

FIG. 6 is a diagram illustrating a third voltage regulator according to an embodiment of the present invention. The major difference between the voltage regulators 600 and 400 is that a compensation circuit 610 included in a feedback loop circuit 606 of the voltage regulators 600 has a compensation current generator (labeled by "$I_{comp}$ Gen") 612 and a filter circuit (labeled by "$A_x(s)$") 614. The compensation circuit 110 may be implemented by the compensation circuit 610, where the parameters $PR_1$-$PR_M$ include PHN, DCM, Trig, etc. The compensation current generator 612 is arranged to receive a plurality of parameters (e.g. PHN, DCM, and Trig), and generate a compensation circuit $I_{comp}$ according to information carried by at least one of the parameters. The loop filter 614 is arranged to apply filtering (e.g. low-pass filtering) to the compensation circuit $I_{comp}$ to generate the compensation signal $S_c$.

In this embodiment, the voltage regulator 600 may be a multi-phase voltage regulator including N (N≥2) sets of power stage circuit and inductor coupled between the controller circuit 402 and the load 101 in parallel. The parameter PHN includes information of a phase change event. For example, the parameter PHN may indicate whether a phase change event happens, and may further indicate that the phase change event changes the number of phases enabled in the voltage regulator 600 from a present phase number to a next phase number (which may be larger than or smaller than the present phase number). In this embodiment, the compensation circuit 610 is arranged to generate the compensation signal $S_c$ in response to a phase number change event. For example, the compensation circuit 610 may set the compensation current $I_{comp}$ according to a difference between the present phase number and the next phase number.

The parameter Trig indicates whether triggering of PWM pulse happens. For example, a control voltage Vc fed into a PWM signal generator circuit 604 is derived from an output signal of a filter circuit 602, and triggering of PWM pulse happens each time the waveform of the control voltage Vc crosses over the waveform of the inductor current $I_L$. In some embodiments of the present invention, the compensation circuit 610 may further refer to the parameter Trig to control the timing (e.g. start time and duration) of generating the compensation signal $S_c$ since the phase number change event. Hence, the compensation circuit 610 may not start generating the compensation signal $S_c$ at the time the phase number change event happens.

The parameter DCM indicates whether an operation mode transition event happens. For example, the operation mode transition event may include transition between CCM and DCM. For another example, the operation mode transition event may include transition between different operation modes supported by the voltage regulator 600. In this embodiment, the compensation circuit 610 is further arranged to generate the compensation signal $S_c$ in response to the operation mode transition event (e.g. DCM/CCM transition event). Furthermore, the compensation circuit 610 may further refer to the parameter Trig to control the timing (e.g. start time and duration) of generating the compensation signal $S_c$ since the operation mode transition event (e.g. DCM/CCM transition event). Hence, the compensation circuit 610 may not start generating the compensation signal $S_c$ at the time the operation mode transition event (e.g. DCM/CCM transition event) happens.

As mentioned above, when the phase number (i.e. the number of phases enabled in the multi-phase voltage regulator) decreases, the remaining phase current needs to be settled to a new level, which may result in undershoot of the output voltage $V_o$. Furthermore, the output voltage undershoot may happen when an operation mode transition event (e.g. CCM/DCM transition event) happens. The compensation signal $S_c$ is derived from the compensation current $I_{comp}$. Since the compensation current $I_{comp}$ is generated in response to the phase number change event or the operation mode transition event, and then injected to the feedback signal $S_{fb}$ generated from the loadline 408 according to the sensed current signal $I_{sen}$ that provides information of the inductor current $I_L$ ($I_{sen} \cong I_L$), disturbance of the feedback signal $S_{fb}$ that results from mismatch between the load current $I_o$ (which may be unchanged during the phase number change event or the operation mode transition event) and the inductor current $I_L$ (which may be increased during the phase number change event or the operation mode transition event) can be compensated by the compensation signal $S_c$.

Figure 7:
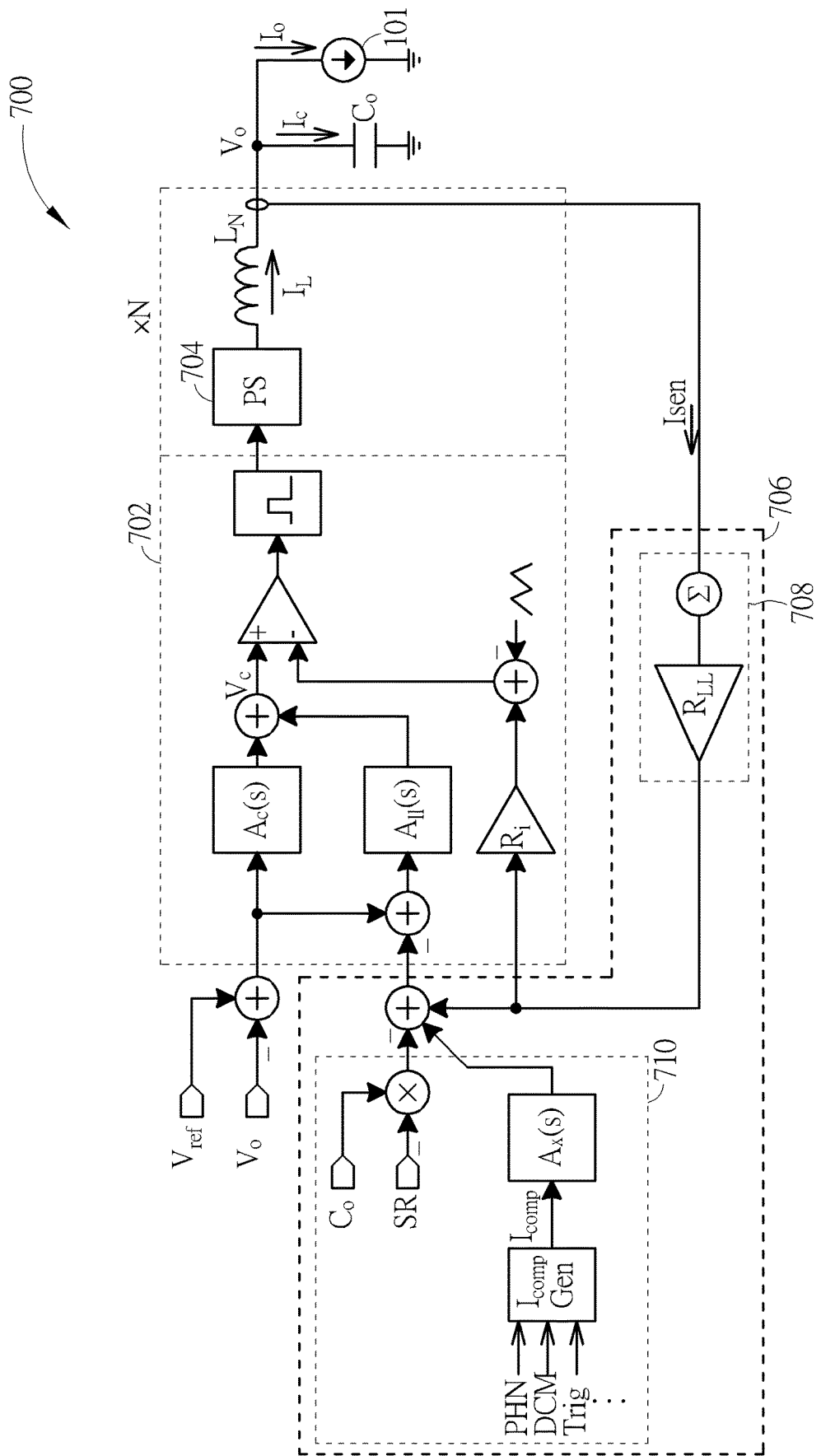
FIG. 7 is a diagram illustrating a fourth voltage regulator according to an embodiment of the present invention.

Regarding the embodiment shown in FIG. 4, the output voltage offset during the DVID event can be compensated by means of the proposed compensation circuit 410. Regarding the embodiment shown in FIG. 6, the output voltage undershoot during the phase number change event or the operation mode transition event can be compensated by means of the proposed compensation circuit 610. In practice, any voltage regulator using one or both of the proposed compensation circuit designs shown in FIG. 4 and FIG. 6 falls within the scope of the present invention. FIG. 7 is a diagram illustrating a fourth voltage regulator according to an embodiment of the present invention. The voltage regulator 700 may be a switching voltage regulator with AVP. The voltage regulator 700 is capable of regulating the output voltage $V_o$ delivered to the load 101. As shown in FIG. 7, the voltage regulator 700 may include a controller circuit 702, a power stage circuit (labeled as "PS") 704, an inductor $L_N$, an output capacitor $C_o$, and a feedback loop circuit 706. In this embodiment, the voltage regulator 700 may be a multi-phase voltage regulator including N (N≥2) sets of power stage circuit and inductor coupled between the controller circuit 702 and the load 101 in parallel. The feedback loop circuit 706 includes a loadline 708 and a compensation circuit 710. The compensation circuit 110 may be implemented by the compensation circuit 710. In this embodiment, the compensation circuit 710 is capable of generating a compensation signal to compensate for an output voltage offset during the DVID event and generating a compensation signal to compensate for an output voltage undershoot during the phase number change event or the operation mode transition event (e.g. CCM/DCM transition event). Since a person skilled in the art can readily understand details of the compensation circuit 710 after reading above paragraphs directed to the compensation circuits 410 and 610, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A feedback loop circuit of a voltage regulator comprising:
   a loadline, arranged to generate a feedback signal according to a sensed current signal that provides information of an inductor current of the voltage regulator, and output the feedback signal to a controller circuit of the voltage regulator for regulating an output voltage of the voltage regulator; and
   a compensation circuit, arranged to generate a compensation signal to compensate for a deviation of the output voltage, wherein in response to a specific event that results in disturbance of the inductor current, the compensation circuit is arranged to make the feedback signal remain unchanged by injecting the compensation signal to the feedback signal generated from the load line.

2. The feedback loop circuit of claim 1, wherein the compensation circuit comprises:
   a compensation current generator circuit, arranged to generate a compensation current; and
   a filter circuit, arranged to apply filtering to the compensation current to generate the compensation signal.

3. The feedback loop circuit of claim 1, wherein the compensation circuit is arranged to generate the compensation signal in response to the specific event that leads to the deviation of the output voltage.

4. The feedback loop circuit of claim 3, wherein the compensation circuit is arranged to generate the compensation signal during a period in which a load current supplied from the voltage regulator to a load is unchanged.

5. The feedback loop circuit of claim 3, wherein the specific event is a dynamic voltage identification (DVID) event that changes the output voltage from a first voltage setting to a second voltage setting.

6. The feedback loop circuit of claim 5, wherein the compensation circuit is arranged to determine the compensation signal according to capacitance of an output capacitor of the voltage regulator and a slew rate of changing the output voltage from the first voltage setting to the second voltage setting.

7. The feedback loop circuit of claim 3, wherein the voltage regulator is a multi-phase voltage regulator, and the specific event is a phase number change event.

8. The feedback loop circuit of claim 7, wherein the phase number change event changes a number of phases enabled in the voltage regulator from a first phase number to a second phase number, and the compensation circuit is arranged to set the compensation signal according to a difference between the first phase number and the second phase number.

9. The feedback loop circuit of claim 7, wherein the compensation circuit is arranged to control timing of generating the compensation signal according to triggering of pulse-width modulation (PWM) pulse since the phase number change event.

10. The feedback loop circuit of claim 3, wherein the specific event is an operation mode transition event.

11. The feedback loop circuit of claim 10, wherein the operation mode transition event comprises transition between a continuous conduction mode (CCM) and a discontinuous conduction mode (DCM).

12. The feedback loop circuit of claim 10, wherein the compensation circuit is arranged to control timing of generating the compensation signal according to triggering of pulse-width modulation (PWM) pulse since the operation mode transition event.

13. A compensation method employed by a voltage regulator comprising:
according to a sensed current signal that provides information of an inductor current of the voltage regulator, generating a feedback signal through a loadline;
generating a compensation signal to compensate for a deviation of an output voltage of the voltage regulation, wherein in response to a specific event that results in disturbance of the inductor current, the compensation signal is injected to the feedback signal generated from the load line, and makes the feedback signal remain unchanged; and
outputting the feedback signal to a controller circuit of the voltage regulator for regulating the output voltage.

14. The compensation method of claim 13, wherein generating the compensation signal to compensate for the deviation of the output voltage comprises:
generating the compensation signal in response to the specific event that leads to the deviation of the output voltage.

15. The compensation method of claim 14, wherein the specific event is a dynamic voltage identification (DVID) event that changes the output voltage from a first voltage setting to a second voltage setting.

16. The compensation method of claim 14, wherein the voltage regulator is a multi-phase voltage regulator, and the specific event is a phase number change event.

17. The compensation method of claim 14, wherein the specific event is an operation mode transition event.

18. The compensation method of claim 17, wherein the operation mode transition event comprises transition between a continuous conduction mode (CCM) and a discontinuous conduction mode (DCM).

* * * * *